US012677730B2

(12) United States Patent
Liu

(10) Patent No.: US 12,677,730 B2
(45) Date of Patent: Jul. 14, 2026

(54) FERTILIZATION CART

(71) Applicant: QINGDAO HUATIAN HAND TRUCK CO., LTD., Qingdao (CN)

(72) Inventor: Zhijun Liu, Qingdao (CN)

(73) Assignee: QINGDAO HUATIAN HAND TRUCK CO., LTD., Qingdao (CN)

( * ) Notice: Subject to any disclaimer, the term of this patent is extended or adjusted under 35 U.S.C. 154(b) by 236 days.

(21) Appl. No.: 18/649,564

(22) Filed: Apr. 29, 2024

(65) Prior Publication Data

US 2025/0295056 A1 Sep. 25, 2025

(30) Foreign Application Priority Data

Mar. 21, 2024 (CN) .......................... 202420551212.8

(51) Int. Cl.
*A01C 17/00* (2006.01)
(52) U.S. Cl.
CPC .......... *A01C 17/008* (2013.01); *A01C 17/001* (2013.01)
(58) Field of Classification Search
CPC ..... A01C 7/085; A01C 17/001; A01C 17/006; A01C 17/008; A01M 9/0061
USPC ....................................................... 239/681
See application file for complete search history.

(56) References Cited

U.S. PATENT DOCUMENTS

| | | | | |
|---|---|---|---|---|
| 4,609,153 A | * | 9/1986 | van der Lely | ....... A01C 17/005 239/665 |
| 4,785,976 A | * | 11/1988 | Bennie | .................. A01C 15/16 239/665 |
| 7,063,280 B1 | * | 6/2006 | Bogart | ................. A01C 17/008 239/681 |
| 10,736,263 B2 | * | 8/2020 | Horeth | ................. A01C 17/001 |
| 2006/0180680 A1 | * | 8/2006 | Gamble, II | ........... E01C 19/203 239/146 |
| 2019/0116724 A1 | * | 4/2019 | Lefebvre | .............. A01C 17/001 |

FOREIGN PATENT DOCUMENTS

| | | | | | |
|---|---|---|---|---|---|
| FR | 1097241 | * | 1/1954 | .......... A01C 17/006 |

* cited by examiner

*Primary Examiner* — Cody J Lieuwen
(74) *Attorney, Agent, or Firm* — Birchwood IP

(57) ABSTRACT

Disclosed is a fertilization cart, including a hopper for containing the fertilizer, a first turntable, and a second turntable, where the first turntable and the second turntable are located below the hopper and arranged in correspondence with discharge openings on the hopper. Spreader openings are formed on either of the first turntable and the second turntable, and when the spreader opening is communicated with the discharge opening after rotating, a spreader channel is formed. The first turntable is capable of rotating relative to the hopper to open or close the spreader channel. The second turntable is capable of rotating relative to the first turntable to adjust the size of the spreader channel. The present disclosure is capable of solving the technical problem in the prior art that the fertilization cart cannot accurately control the amount of fertilizer for different vegetation.

9 Claims, 5 Drawing Sheets

83

84

81

82

FERTILIZATION CART

CROSS-REFERENCE TO RELATED APPLICATIONS

The application claims priority to Chinese patent application No. 202420551212.8, filed on Mar. 21, 2024, the entire contents of which are incorporated herein by reference.

TECHNICAL FIELD

The present disclosure belongs to the technical field of agricultural machinery, and particularly relates to a fertilization cart.

BACKGROUND

Agricultural machinery refers to various machinery used in the process of crop cultivation, animal husbandry production and primary processing and treatment of agricultural and livestock products. Specifically, agricultural machinery includes agricultural power machinery, agricultural field construction machinery, soil cultivation machinery, planting and fertilizing machinery, plant protection machinery, agricultural irrigation and drainage machinery, crop harvesting machinery, agricultural product processing machinery, livestock machinery, and agricultural transportation machinery, which are widely applied in daily life.

Fertilization machinery is mainly used for fertilization. Different fertilization machinery can be selected for different crops to evenly spread the fertilizer on the soil, thereby improving the fertilizer utilization rate and promoting crop growth.

For small-scale vegetation or crops, fertilization carts are usually used for fertilization. However, because different fertilizers and amounts are used for different vegetation, existing fertilization carts are not capable of accurately controlling the amount of fertilizer for different vegetation, and are only suitable for fertilizing a single type of vegetation. Furthermore, for different vegetation, different types of fertilization carts need to be used, resulting in that work costs are increased and work efficiency is reduced.

In view this, the prior art is required to be further improved.

SUMMARY

To overcome various defects in the prior art, the present disclosure provides a fertilization cart, to solve the technical problem in the prior art that the fertilization cart cannot accurately control the amount of fertilizer for different vegetation.

To achieve the above objective, the present disclosure adopts the following technical solution:

A fertilization cart, including a hopper for containing the fertilizer, a first turntable, and a second turntable, where the first turntable and the second turntable are located below the hopper and arranged in correspondence with discharge openings on the hopper; spreader openings are formed on either of the first turntable and the second turntable, and when the two spreader openings are communicated with the discharge openings after rotating, a spreader channel is formed; the first turntable is capable of rotating relative to the hopper to open or close the spreader channel; and the second turntable is capable of rotating relative to the first turntable to adjust the size of the spreader channel.

In a further technical solution, the discharge opening and the spreader opening have the same shape, and a plurality of discharge openings and spreader openings are arranged at intervals along the circumferential direction.

In a further technical solution, a throwing disc is arranged below the second turntable, the throwing disc rotates to radially spread the fertilizer falling into the throwing disc, and the first turntable, the second turntable and the throwing disc are coaxially arranged.

In a further technical solution, a first limiting block is fixedly arranged at the bottom of the first turntable, arc-shaped first limiting holes are formed on the second turntable, and the first limiting block is slidably embedded into the first limiting hole.

In a further technical solution, a plurality of arc-shaped second limiting holes are formed on both the first turntable and the second turntable along the circumferential direction, a second limiting block penetrates through the second limiting hole and is detachably connected to the hopper, and two end portions of the second limiting hole are equidistant from the center of the first turntable.

In a further technical solution, the fertilization cart further includes an adjusting assembly, and the adjusting assembly includes a first connecting plate that is fixedly connected to the hopper and a baffle plate that is located on an inner side of the first connecting plate and detachably connected to the first connecting plate. The inner side thereof is closer to the first turntable, and the bottom of the baffle plate is not lower than the throwing disc.

In a further technical solution, a limiting plate is fixedly arranged on the inner side of the first connecting plate, and a plurality of grooves are formed on the limiting plate. A second connecting plate is extended radially along the second turntable, a third limiting block is fixedly arranged on the second connecting plate, a plurality of protrusions that are in fit with the grooves are arranged on the third limiting block, and the number of the protrusions is less than the number of the grooves.

In a further technical solution, the first turntable and the second turntable are both of a semicircular structure or a fan-shaped structure with a central angle greater than 180 degrees.

In a further technical solution, a rack is further included, the hopper is mounted on the rack, rollers are connected to the bottom of the rack, a transmission assembly is fixedly arranged on the axle of the roller, and the transmission assembly is in transmission connection with the throwing disc.

In a further technical solution, a control handle is arranged on the rack, and the control handle is connected to the first turntable.

The present disclosure has the following beneficial effects:

The opening/closing state and size of the spreader channel are controlled by the first turntable and the second turntable respectively. To use another type of fertilizer, it is only necessary to close the spreader channel and adjust the rotation angle of the second turntable, without need of replacing the fertilization cart, which is capable of accurately controlling the amount of fertilizer for different vegetation, with high work efficiency despite of simple operation steps.

3

Figure 1:
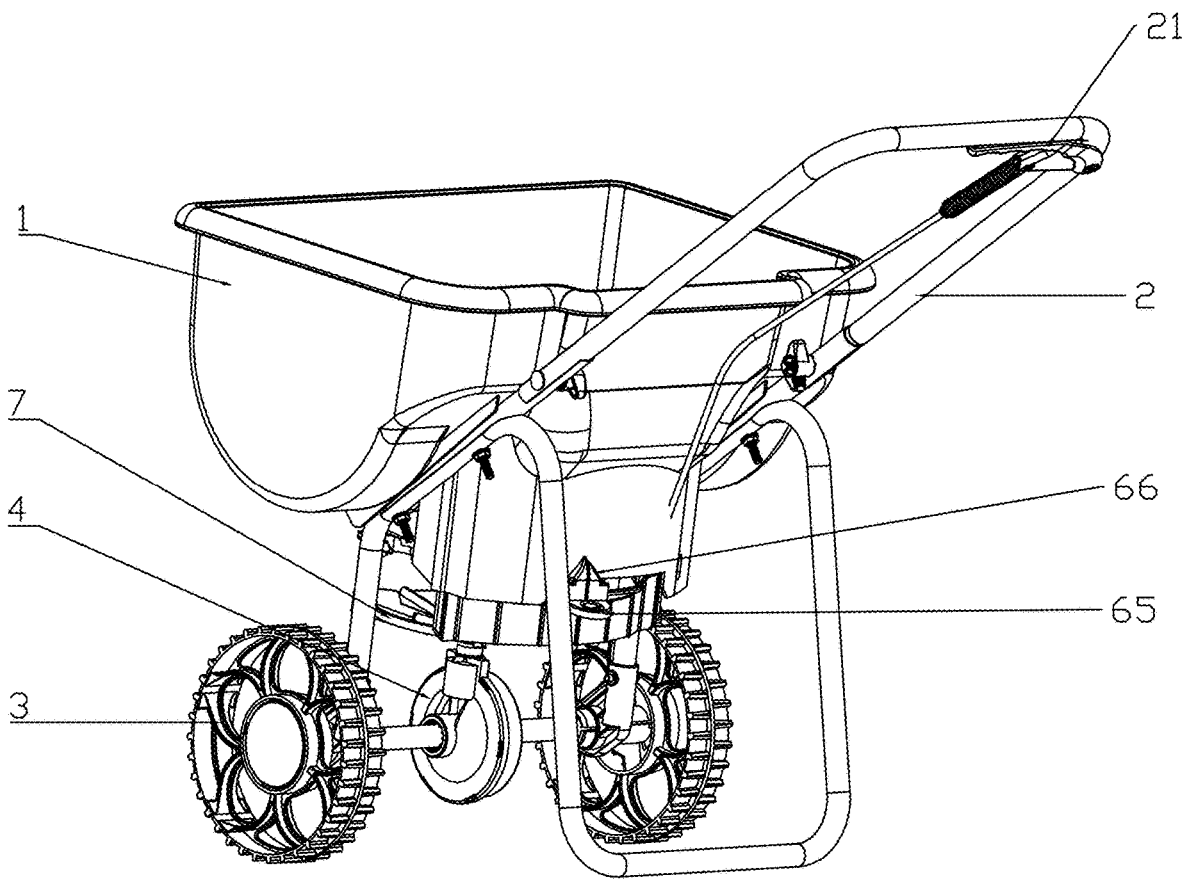
FIG. 1 is a schematic diagram of a fertilization cart according to an embodiment of the present disclosure.
Figure 2:
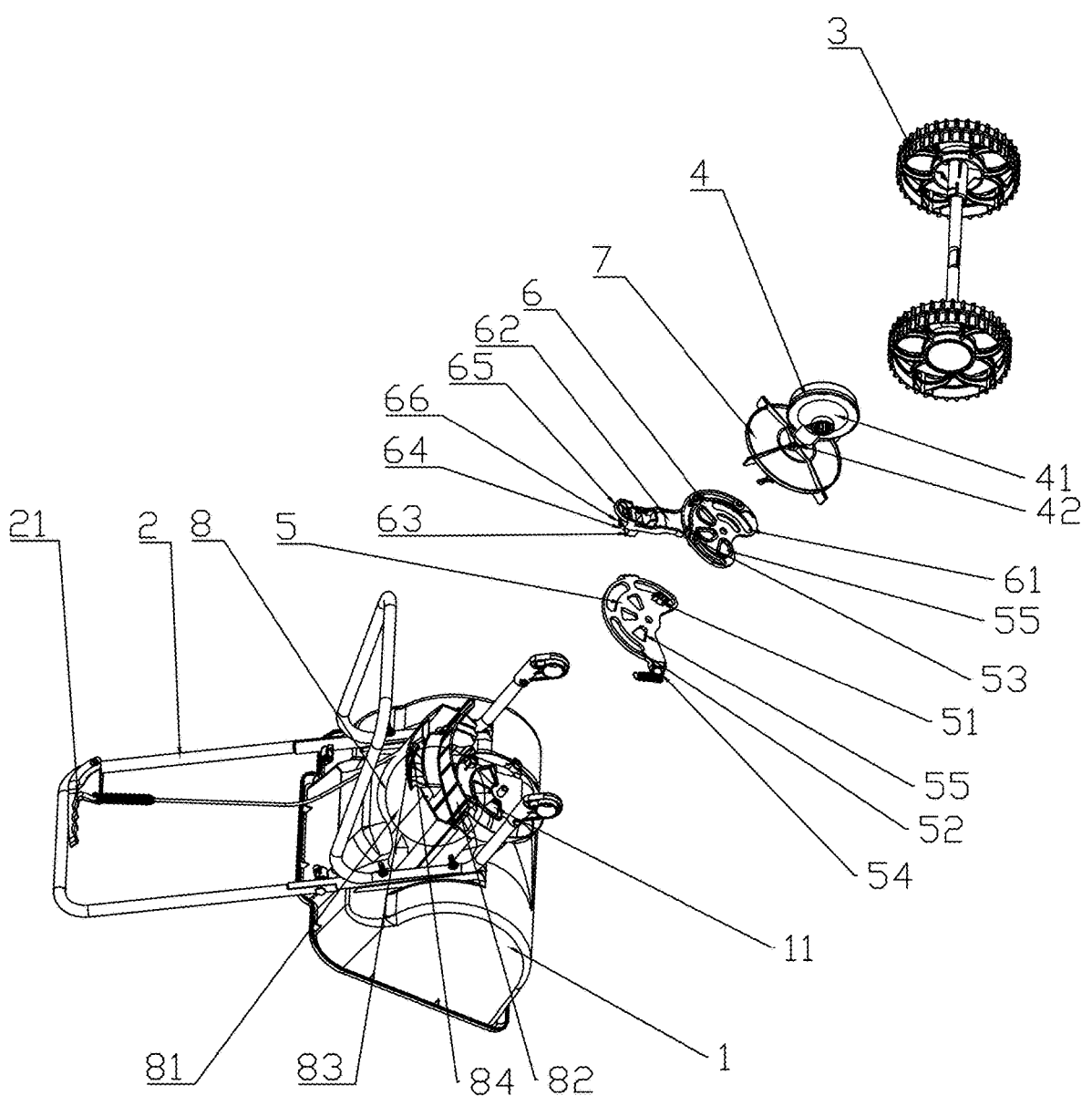

FIG. 2 is an exploded view of a fertilization cart according to an embodiment of the present disclosure.

Figure 3:
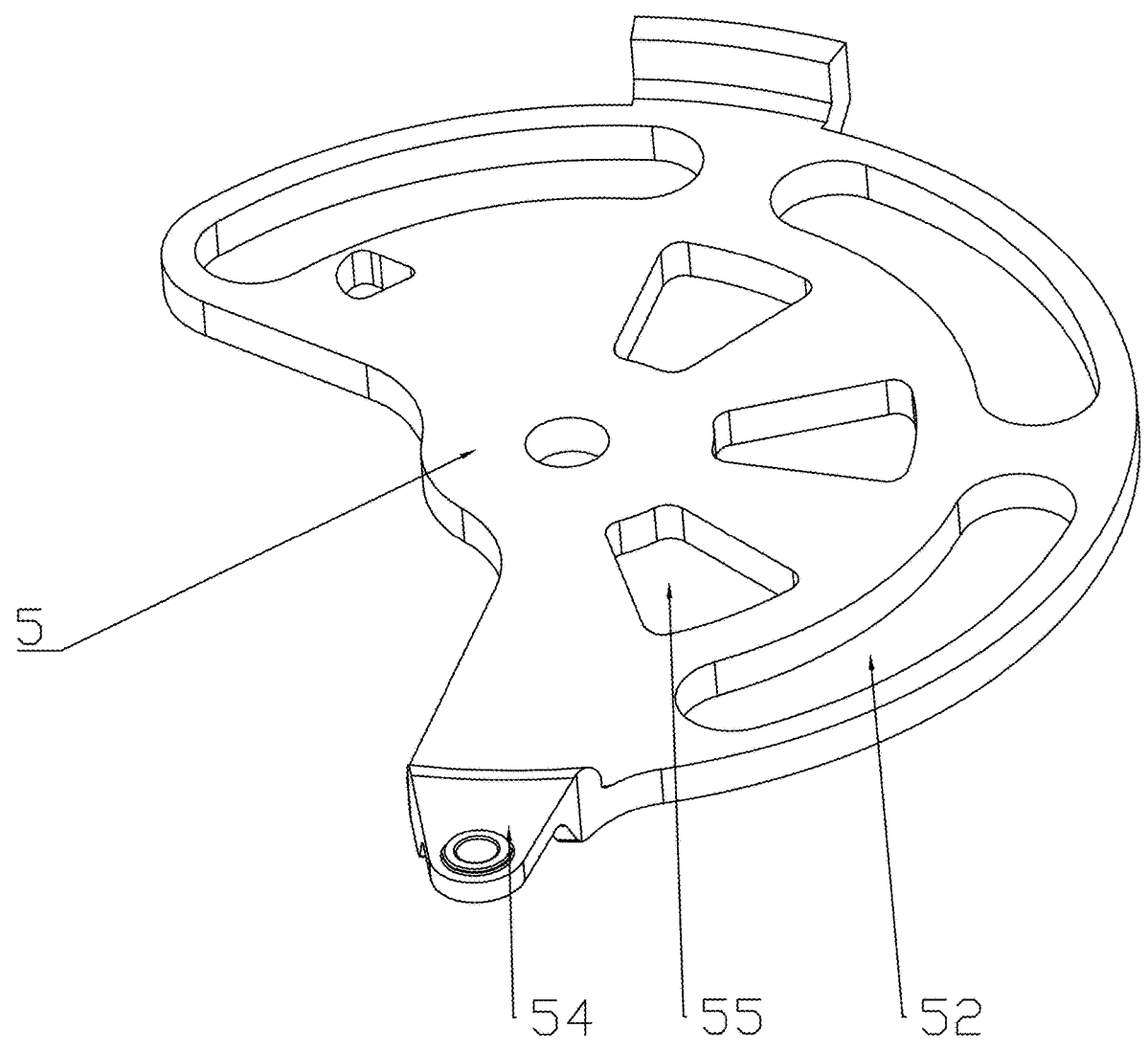

FIG. 3 is a schematic diagram of a first turntable according to an embodiment of the present disclosure.

Figure 4:
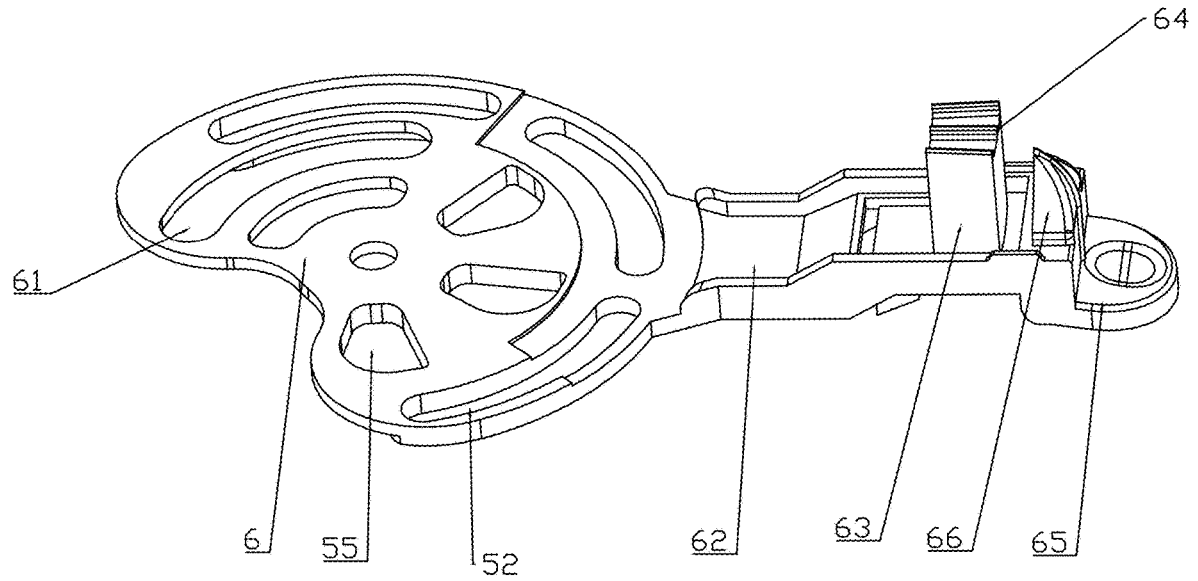

FIG. 4 is a schematic diagram of a second turntable according to an embodiment of the present disclosure.

Figure 5:
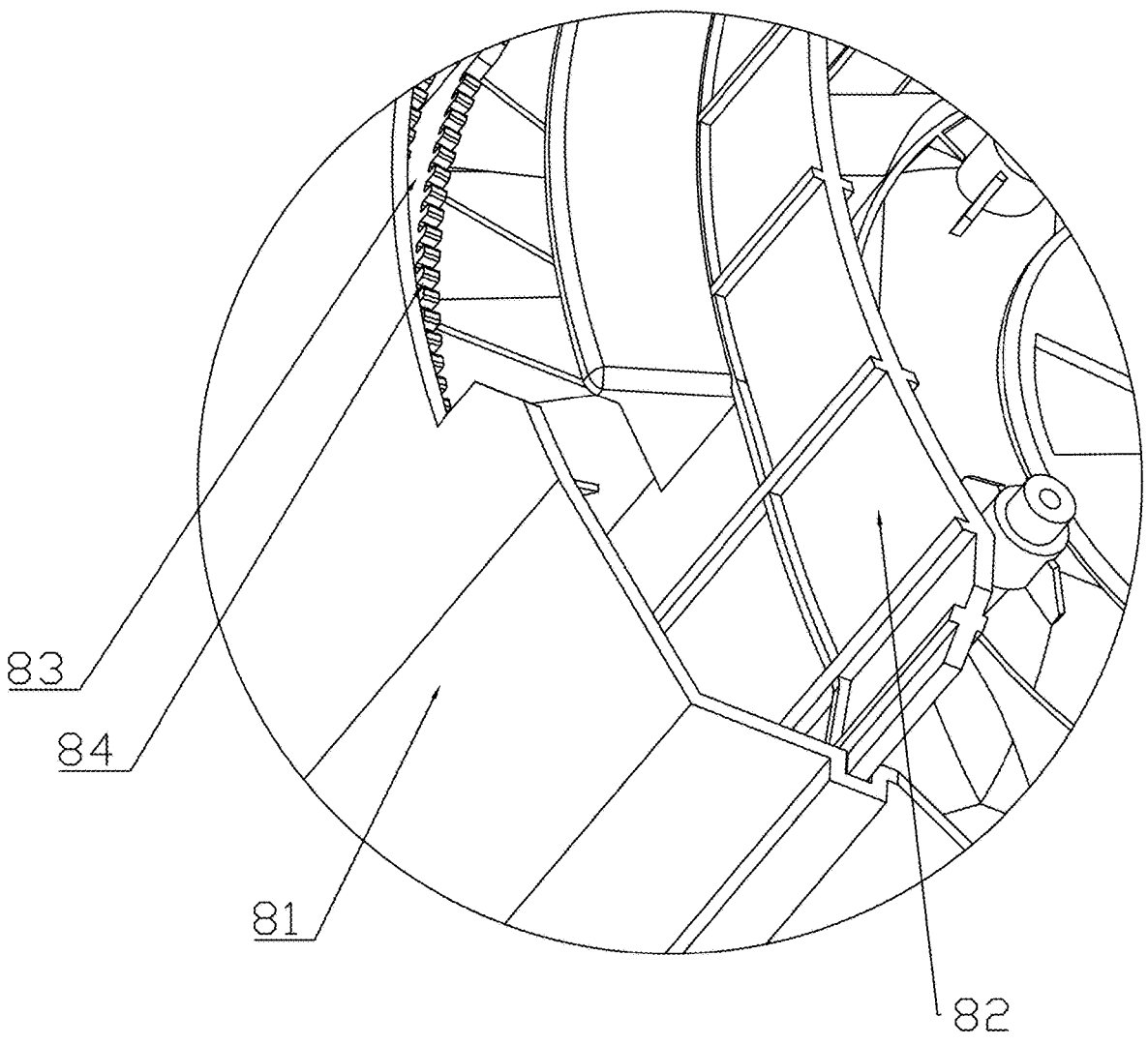

FIG. 5 is a partial enlarged view of a position A in FIG. 2.

In the figures: 1, hopper; 11, discharge opening; 2, rack; 21, control handle; 3, roller; 4, transmission assembly; 41, gear disc; 42, rotating shaft; 5, first turntable; 51, first limiting block; 52, second limiting hole; 53, second limiting block; 54, lug; 55, spreader opening; 6, second turntable; 61, first limiting hole; 62, second connecting plate; 63, third limiting block; 64, protrusion; 65, plectrum; 66, pointer; 7, throwing disc; 8, adjusting assembly; 81, first connecting plate; 82, baffle plate; 83, limiting plate; and 84, groove.

DESCRIPTION OF EMBODIMENTS

In order to enable those skilled in the art to better understand the technical solutions of the present disclosure, the technical solutions of the present disclosure will be clearly and completely described below in combination with the accompanying drawings in the present disclosure. Based on the embodiments of the present disclosure, all other embodiments acquired by those of ordinary skill in the art without making creative efforts fall within the scope of protection of the present disclosure. Further, the directional terms referred to in the following embodiments, such as "up", "down", "left", "right", etc., only indicate the directions in the accompanying drawings. Therefore, the directional terms used are for illustrative purposes and not intended to limit the scope of the present disclosure.

The present disclosure will be further described below with reference to the accompanying drawings and preferred embodiments.

According to an embodiment of the present disclosure, there is provided a fertilization cart. With reference to FIGS. 1 to 5, the fertilization cart includes a hopper 1 for containing the fertilizer, a first turntable 5, and a second turntable 6, where the first turntable 5 and the second turntable 6 are located below the hopper 1 and arranged in correspondence with discharge openings 11 on the hopper 1. Spreader openings 55 are formed on either of the first turntable 5 and the second turntable 6, and when the spreader openings 55 are communicated with the discharge openings 11 after rotating, a spreader channel is formed. The first turntable 5 is capable of rotating relative to the hopper 1 to open or close the spreader channel. The second turntable 6 is capable of rotating relative to the first turntable 5 to adjust the size of the spreader channel. A throwing disc 7 is arranged below the second turntable 6, and the throwing disc 7 rotates to radially spread the fertilizer falling into the throwing disc 7.

It should be noted that, when the fertilization cart works, the second turntable 6 is first rotated to adjust the position of the spreader opening 55 on the second turntable 6, and then the spreader opening 55 of the first turntable 5 is rotated to align with the discharge opening 11 of the hopper 1, so that the spreader channel is opened, and the fertilizer falls into the throwing disc 7 and is spread as the throwing disc 7 rotates. The opening/closing state and size of the spreader channel are controlled by the first turntable 5 and the second turntable 6 respectively. To use another type of fertilizer, it is only necessary to close the spreader channel and adjust the rotation angle of the second turntable 6, without need of replacing the fertilization cart, which is capable of accurately controlling the amount of fertilizer for different vegetation, with high work efficiency despite of simple operation steps.

Specifically, the first turntable 5 is located below the hopper 1 and fitted with the discharge opening 11 of the hopper 1, while the second turntable 6 is located below the first turntable 5 and fitted with the first turntable 5.

Preferably, the first turntable 5 and the second turntable 6 are both of a semicircular structure or a fan-shaped structure with a central angle greater than 180 degrees.

The fertilization cart of this embodiment further includes a rack 2, the hopper 1 is mounted on the rack 2, a control handle 21 is arranged on the rack 2, and the control handle 21 is connected to the first turntable 5. The first turntable 5 is rotated by controlling the control handle 21, so that the spreader channel is opened or closed. Preferably, a lug 54 is arranged at the edge of the first turntable 5, a spring is connected to the lug 54, the control handle 21 and the first turntable 5 are connected through the spring, and the spring is adjusted by means of the control handle 21 to control the first turntable 5.

Rollers 3 are connected to the bottom of the rack 2, a transmission assembly 4 is fixedly arranged on the axle of the roller 3, and the transmission assembly 4 is in transmission connection with the throwing disc 7.

It should be noted that, the transmission assembly 4 includes a gear disc 41 and a rotating shaft 42, where the gear disc 41 is provided with a first bevel gear and a second bevel gear that are meshed with each other. The first bevel gear rotates with the rollers 3, the rotating shaft 42 is fixedly connected to the center of the second bevel gear, and the throwing disc 7 is fixedly connected to the second bevel gear through the rotating shaft 42, so that the throwing disc 7 rotates with the second bevel gear, thereby spreading the fertilizer.

Specifically, the first turntable 5, the second turntable 6 and the throwing disc 7 are coaxially arranged, and the rotating shaft 42 sequentially penetrates through the centers of throwing disc 7, the second turntable 6 and the first turntable 5, and also the bottom of the hopper 1, and is limited by a positioning pin to ensure the stability of the fertilization cart.

In the fertilization cart of this embodiment, the discharge opening 11 and the spreader opening 55 have the same shape, and a plurality of discharge openings 11 and spreader openings 55 are arranged at intervals along the circumferential direction, to ensure uniform fertilizer spreading. Further, the arrangement at intervals ensures that the spreader channel can be closed by rotating the first turntable 5.

In the fertilization cart of this embodiment, a first limiting block 51 is fixedly arranged at the bottom of the first turntable 5, arc-shaped first limiting holes 61 are formed on the second turntable 6, the first limiting block 51 is slidably embedded into the first limiting hole 61, and the rotation range of the first turntable 5 is limited through matching of the first limiting block 51 and the first limiting hole 61.

In the fertilization cart of this embodiment, a plurality of arc-shaped second limiting holes 52 are formed on both the first turntable 5 and the second turntable 6 along the circumferential direction, and a second limiting block 53 penetrates through the second limiting hole 52 and is detachably connected to the hopper 1. Two end portions of the second limiting hole 52 are equidistant from the center of the first turntable 5, and the two end portions of the second limiting hole 52 are also equidistant from the center of the second turntable 6.

The fertilization cart of this embodiment further includes an adjusting assembly 8, and the adjusting assembly 8 includes a first connecting plate 81 that is fixedly connected to the hopper 1 and a baffle plate 82 that is located on an inner side of the first connecting plate 81 and detachably connected to the first connecting plate 81. The inner side thereof is closer to the first turntable 5, and the bottom of the baffle plate 82 is not lower than the throwing disc 7.

Specifically, the baffle plate 82 is arranged near the throwing disc 7 and located behind the throwing disc 7. Due to the arrangement of the baffle plate 82, the fertilizer cannot fall backward during fertilization, thereby preventing skin exposure of the operator to the fertilizer, and avoiding harm to the human body.

In the fertilization cart of this embodiment, a limiting plate 83 is fixedly arranged on the inner side of the first connecting plate 81, and a plurality of grooves are formed on the limiting plate 83. A second connecting plate 62 is extended radially along the second turntable 6, a third limiting block 63 is fixedly arranged on the second connecting plate 62, a plurality of protrusions 64 that are in fit with the grooves 84 are arranged on the third limiting block 63, and the number of the protrusions 64 is less than the number of the grooves 84.

It should be noted that, through the adjustment of relative positions of the second connecting plate 62 and the limiting plate 83, the protrusions 64 can be embedded into different grooves 84, so that the size of the spreader channel can be adjusted by switching different gear positions. Due to the matching of the protrusions 64 and the grooves 84, the second turntable 6 can be fixed, so that the uniformity of fertilizer spreading during rotation of the second turntable 6 when the fertilization cart works is ensured. Specifically, 17 gear positions are arranged, to adapt to the circumstances of spreading different fertilizers. Further, a plectrum 65 and a pointer 66 are arranged at an end portion of the second connecting plate 62, where the pointer 66 is in fit with an outer wall of the first connecting plate 81, the outer wall of the first connecting plate 81 is provided with scales indicating gear positions, and the pointer 66 points to the scale to facilitate the intuitive and accurate adjustment of the size of the spreader channel. By pressing down the plectrum 65, the protrusion 64 can be pulled out of the groove 84, so that the gear position is changed.

When the fertilization cart is idle, the spreader channel is closed. After loading the fertilizer into the hopper 1, the plectrum 65 is moved according to the type of fertilizer and the required spreading density to adjust the gear position, until the size of the spreader channel is appropriate. In this case, the fertilizer operator behind the fertilization cart controls the control handle 21 to open the spreader channel, and pushes the fertilization cart forward. The fertilizer falls into the throwing disc 7 through the spreader channel and is spread as the throwing disc 7 rotates. After the fertilization is completed, the control handle 21 is controlled again to close the spreader channel.

The present disclosure has been described above in detail. The above embodiments are merely preferred embodiments of the present disclosure, and are not intended to limit the scope of implementations of the present disclosure, that is, equivalent changes and modifications made within the scope of claims of the present disclosure shall fall within the scope of the present disclosure.

What is claimed is:

1. A fertilization cart, comprising: a hopper for containing a fertilizer, a first turntable, and a second turntable, wherein the first turntable and the second turntable are located below the hopper and arranged in correspondence with discharge openings on the hopper;

two spreader openings are formed on either of the first turntable and the second turntable, and when the two spreader openings are communicated with the discharge openings after rotating, a spreader channel is formed;

the first turntable is capable of rotating relative to the hopper to open or close the spreader channel; and the second turntable is capable of rotating relative to the first turntable to adjust a size of the spreader channel;

wherein arc-shaped first limiting holes are formed on the second turntable, wherein a plurality of arc-shaped second limiting holes are formed on both the first turntable and the second turntable along a circumferential direction, and a second limiting block penetrates through the plurality of second limiting holes and is detachably connected to the hopper.

2. The fertilization cart according to claim 1, wherein the discharge openings and the two spreader openings have the same shape, and the discharge openings and the two spreader openings are arranged at intervals along the circumferential direction.

3. The fertilization cart according to claim 2, wherein a throwing disc is arranged below the second turntable, the throwing disc rotates to radially spread the fertilizer falling into the throwing disc, and the first turntable, the second turntable and the throwing disc are coaxially arranged.

4. The fertilization cart according to claim 3, wherein a first limiting block is fixedly arranged at a bottom of the first turntable, and the first limiting blocks are slidably embedded into the first limiting holes.

5. The fertilization cart according to claim 3, further comprising a rack, wherein the hopper is mounted on the rack, rollers are connected to a bottom of the rack, a transmission assembly is fixedly arranged on an axle of the rollers, and the transmission assembly is in transmission connection with the throwing disc.

6. The fertilization cart according to claim 5, wherein a control handle is arranged on the rack, and the control handle is connected to the first turntable.

7. The fertilization cart according to claim 1, further comprising an adjusting assembly, wherein the adjusting assembly comprises a first connecting plate being fixedly connected to the hopper and a baffle plate being located on an inner side of the first connecting plate and detachably connected to the first connecting plate; and the inner side thereof is closer to the first turntable, and the bottom of the baffle plate is not lower than the throwing disc.

8. The fertilization cart according to claim 7, wherein a limiting plate is fixedly arranged on the inner side of the first connecting plate, and a plurality of grooves are formed on the limiting plate; and a second connecting plate is extended radially along the second turntable, a third limiting block is fixedly arranged on the second connecting plate, a plurality of protrusions being in fit with the grooves are arranged on the third limiting block, and the number of the protrusions is less than the number of the grooves.

9. The fertilization cart according to claim 8, wherein the first turntable and the second turntable are both of a semicircular structure or a fan-shaped structure with a central angle greater than 180 degrees.

* * * * *